Oct. 13, 1959  B. NEDOW  2,908,332
FISHING TOOL
Filed June 14, 1956  2 Sheets-Sheet 1
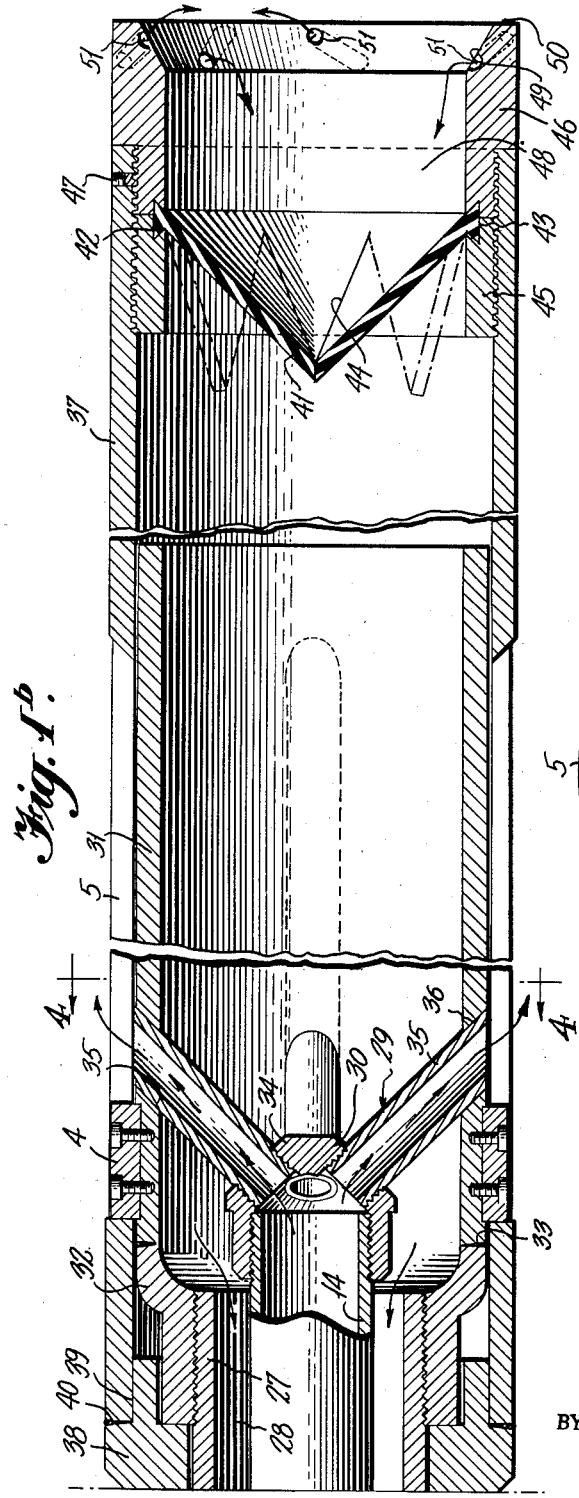
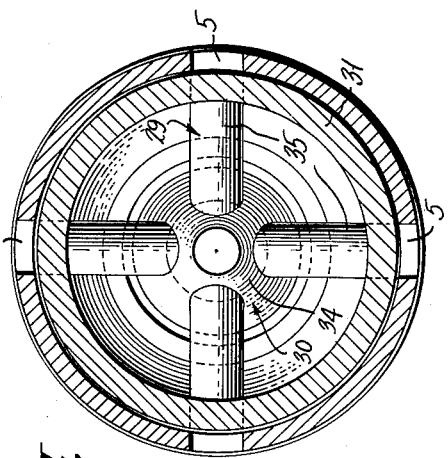
INVENTOR
*Ben Nedow*
BY
*Mason, Fenwick & Lawrence*
ATTORNEYS

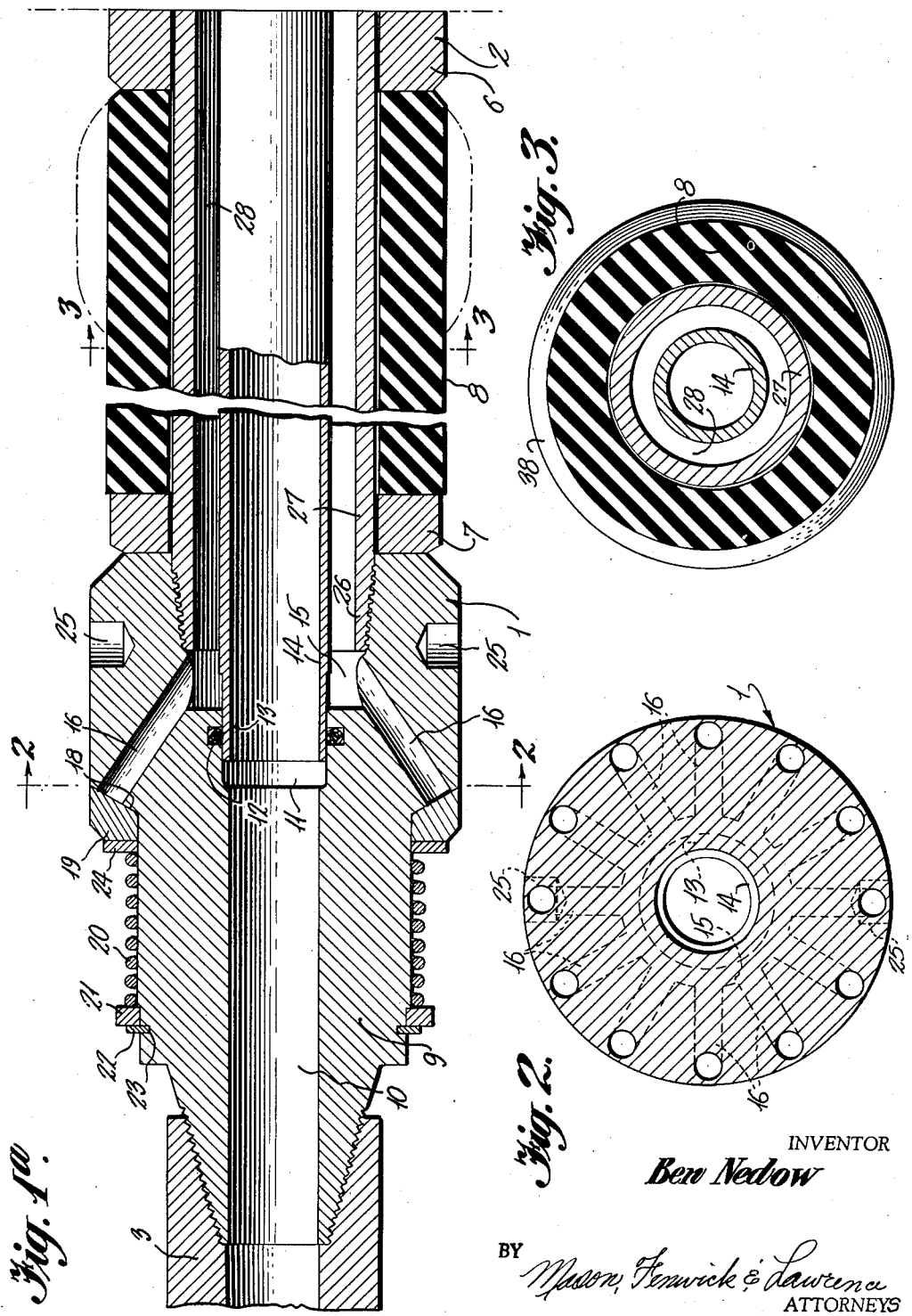

2,908,332
FISHING TOOL

Ben Nedow, Odessa, Tex.

Application June 14, 1956, Serial No. 591,433

11 Claims. (Cl. 166—99)

This invention relates to the general class of tools for recovering junk from oil wells, and particularly to a fishing tool of the general type comprising telescoping members fitting the well or casing bore with clearance, and being unitarily related in tandem relation whereby one part suspends the other, said members carrying between them in surrounding relation a deformable packer sleeve against the ends of which the members thrust when the lower member lodges upon the bottom of the well or upon an object at the bottom, expanding the packer sleeve sealingly against the well or casing wall under the pressure of the weight of the upper member and the pipe string which suspends it. In this type of fishing tool the lower member has an open lower end for surrounding the junk, being the mouth of a junk receiving chamber or basket and controlled by an inwardly opening junk passing and junk retaining check valve, the fishing tool being arranged with ports and passages to convey and direct the forceful flow of fluid supplied by a pump, into the mouth of the junk basket from without the tool, so as to push or wash the junk through the check valve into the junk basket, the fluid then discharging into the well or casing bore above the sealed zone.

The general object of the present invention is the provision of improvements in a fishing tool of the type described, which promote simplicity of construction and ease and economy in manufacture and replacement of parts.

Among the specific objects of the invention are the axially slidable joint between the head of the fishing tool and the central inlet pipe, which type of joint immeasurably simplifies the removal of the head to give access to the deformable packer sleeve for renewal of the latter; the outlet valve seated on the head which permits objects such as pebbles, small hardware, etc., which may drop into the well, from getting into the fluid passages; the novel conduit system within the tool for directing the hydraulic flow; the sectional construction of the tool, giving access to all parts of the hydraulic system for cleaning or removal of obstructions; the novel retaining flange for the junk check valve and the seat forming structure therefor which prevents the displacement of the check valve under the weight of the heaviest junk that is capable of passing the valve, and at the same time makes easy the removal of the junk check valve to enable the retrieved junk to be removed from the junk basket.

Other objects of the invention will appear as the following description of a practical embodiment thereof proceeds.

In the drawing, throughout the figures of which the same reference characters have been employed to denote identical parts:

Figures 1a and 1b, arranged in axial alignment represent a longitudinal section through a fishing tool embodying the principles of the present invention, parts being in elevation, and the view being broken at several places in order to condense its length;

Figure 2 is a cross-section taken along the line 2—2 of Figure 1a;

Figure 3 is a cross-section taken along the line 3—3 of Figure 1a;

Figure 4 is a cross-section taken along the line 4—4 of Figure 1b.

Referring now in detail to the drawings, my fishing tool is constructed with a body consisting of two parts 1 and 2 telescopically arranged. Since each part comprises several sections, the general description is best approached by momentarily ignoring the sectional structure of the parts to state that part 1 is suspended from the pipe string 3, and in turn suspends the part 2 into which it slidably extends, by means of the slide blocks 4 bolted to the part 1 which play in parallel guide slots 5 formed in the part 2, upon which slide blocks the part 2 rests when the fishing tool is freely suspended. The part 2 begins with the filler ring 6, and the part 1 has a similar filler ring 7, between which rings the deformable rubber or rubber-like packer sleeve 8 is interposed. When the suspended body reaches a point at the bottom of the well at which it contacts the bottom or makes contact with junk on the bottom, so that the part 2 becomes supported, the part 1 under its own weight plus that of the pipe string descends relative to the part 2, the slide blocks 4 travelling down the guide slots 5 and the packer sleeve 8 being compressed between the filler rings 6 and 7 and caused to bulge against the surrounding wall of the well hole or casing, as indicated in broken lines in Figure 1a, sealing off the annular space in the well outside of the fishing tool in a zone intermediate the ends of said tool.

Adverting to the details, the part 1 of the body has a head fitting 9 at its upper end, which is threaded at its upper end to enable it to be coupled to the pipe string 3. Said fitting has an axial passage therethrough consisting of the inlet bore 10 and an adjacent coaxial counterbore 11, at an intermediate zone in its length, the wall of said counterbore having an annular coaxial channel 12, in which the O-ring 13 is seated. The counterbore 11 forms the seat for the slightly reduced upper end of an inlet pipe 14 which is pushed into the counterbore past the O-ring, and forms a sealed joint with the head fitting.

Contiguous to the counterbore 11, the passage through the head fitting expands in diameter to form an annular fluid outlet chamber 15 surrounding said inlet pipe, which chamber opens to the outside of the head fitting through a plurality of symmetrically arranged outwardly and upwardly inclined bores 16, which open in the face of a peripheral shoulder 18 formed on the head fitting, said face as shown being normal to the axes of said bores. The shoulder 18 forms the seat for a ring valve 19 biased in closing direction by a spring 20, which surrounds the head fitting. Said spring thrusts against a washer 21, which is anchored by a split ring 22 seated in an exterior groove 23 formed in the surface of the head fitting, said spring holding the ring valve 19 seated under light pressure transmitted through the intermediary of the washer 24. The purpose of the ring valve is to guard the bores 16 from receiving small pieces of anything that may fall into the well from above while the tool is being lowered.

From the shoulder 18 to its lower end, the head fitting 9 is of enlarged diameter. The enlarged portion has tool-receiving pits 25 at opposite points. Internally, contiguous to the fluid outlet chamber 15 it is formed with a wide threaded axial counterbore 26, to which the fluid outlet pipe 27 is coupled, the latter pipe coaxially surrounding the fluid inlet pipe to provide an annular space 28 through which the outflowing fluid travels.

All of the structure above described in detail is seen in Figure 1a. Turning now to Figure 1b, it is to be noted that the lower ends of the fluid inlet pipe 14 and fluid outlet pipe 27 are connected to a rather intricate fitting 29, which is made in four parts unitarily joined, in part by welding. These parts comprise the fluid distributing head 30, having a threaded bore into which the fluid inlet pipe 14 is screwed; the cylindrical sleeve 31 which slides within part 2 of the fishing tool in close relation to the inner wall thereof, and forms a closure between the guide slots 5 and the junk basket to exclude fluid that would otherwise bypass the lower end of the tool; a reducing cap 32 to which the fluid outlet pipe 27 is screwed, and which in turn is joined to the sleeve 31 by welding, as shown at 33 and the pipes 35 which are in communication with the fluid inlet pipe 14 and with the space in the well outside the fishing tool and below the packer sleeve 8.

The distributing head 30 has a conical face 34 penetrated by threaded bores axially normal to said conical face and symmetrically disposed, communicating with the fluid inlet pipe into each of which bores a distributing pipe 35 is screwed. The distributing pipes are in number equal to the guide slots 5; they extend divergently downward toward said slots passing through complementary inclined bores 36 in the sleeve 31, and terminating flush with the outer cylindrical surface of said sleeve. In positioning the distributing pipes 35 they are, of course, first passed through the inclined bores preformed in the sleeve, then screwed into the bores in the distributing head, and finally cut off flush with the outer surface of the sleeve 31. If the fit of the pipe 35 in the inclined bores 36 is reasonably precise, no welding is required between the pipes 35 and the sleeve 31. The fluid conducted by the pipes 35 flows out through the guide slots 5. The slide blocks 4 are preferably set in mortises in the sleeve 31 so that the bolts which secure said slide blocks are relieved of shearing stress. This completes the description of the structure of part 1 of the fishing tool.

Now adverting to part 2, all of said part is shown in Figure 1b, with the exception of the filler ring 6 which has already been referred to. Part 2 includes the tubular shell 37 which is formed with the guide slots 5 and the lower part of which constitutes the junk basket. The upper part of the shell 37 extends above the slots 5 a sufficient distance to surround the reducing cap 32, with its upper end level with the top of said cap, when the body parts are at their limit of mutual extension, that is, when the body is freely suspended with the slide blocks in the upper ends of the slots 5, the position shown in Figures 1a and 1b. An inwardly extending collar 38 has a deep peripheral rabbet 39 receiving the upper end of the shell 37, the two interfitted members being unified by the welded joint 40. The collar overhangs the upper end of the reducing cap and thus acts as a stop supplementary to the stop afforded by the engagement of the slide blocks 4 with the upper ends of the slots 5 in carrying the weight of the suspended body part 2.

The shell 37 is internally threaded at its lower end to receive the cooperating members for mounting and maintaining the junk check valve 41. Said check valve in the preferred form shown is a stout hollow right conical body such as rubber or laminated rubber-bonded canvas, having a peripheral seating flange 42 about its base, the outer circumferential face 43 of which is parallel to the axis of the conical body while the upper and under faces of said flange mutually converge, giving the flange the cross-sectional shape of a truncated triangle or dovetail. The junk check valve is formed with a system of slots 44 therethrough, said slots starting at the apex and extending downwardly in radial planes to points adjacent the base of the conical body. The check valve is mounted in invaginated relation to the junk basket, the slits opening upwardly in the manner shown in broken lines in Figure 1b responsive to fluid pressure inwardly directed from the lower end of the fishing tool or pressure of the junk impaled by said fluid. When the junk has passed the check valve and is in the junk chamber, its weight after the fluid pressure has been cut off, tends to crowd together the sectors of the valve formed by the slitting, so that the mutual interference of these sectors prevents the valve from evaginating under the weight of the trapped junk, so that the latter cannot pass back through said check valve.

The junk check valve 41 is mounted between the retaining ring 45 and the annular shoe 46, which forms the lower end of the fishing tool. The retaining ring which is of uniform height and externally threaded is screwed to its limit within the threaded area at the lower end of the shell. The shoe 46 has a reduced externally threaded upper portion which screws against the retaining ring. Both the retaining ring and said reduced upper portion are grooved in their adjacent faces mutually to form a dove-tail channel complementary in cross-sectional shape and size to the cross-section of the seating flange of the junk check valve.

In mounting, the junk check valve is pushed through the retaining ring until the upper part of its seating flange becomes fitted into the corresponding groove in the retaining ring. Then the shoe is screwed upwardly until the groove at the end of its reduced portion has completely enveloped the part of the seating flange below the plane of the lower face of the retaining ring.

The shoe 46 is secured by the set screw 47. The shoe 46 is an annular member, the central opening 48 of which is of the maximum size permissible within structural limitations so as to enable it to pass large sized junk such as broken or lost bits, etc. Said shoe has a flaring mouth 49 at its lower end which reduces the annular bottom edge 50 of the shoe to a narrow width, facilitating the ability of the fishing tool to sink through layers of silt which may have buried the junk, and enabling the tool to be rotated with minimum friction should it land on a piece of junk in order for it to slip off of and surround the junk.

The shoe 46 is designed so that the outside diameter fits the hole as close as practical, being beveled on the inner side to allow an entrance to the bowl.

A series of holes is drilled circumferentially in the lower end or the mouth of the shoe to provide a jet action of the fluid being pumped into the tool. Half of the number of these holes are drilled tangentially and directed angularly toward the bottom. The jet stream from these holes tend to raise the junk from the bottom. The other half of the holes are also drilled tangential but the angle is directed upward, forcing the junk upward into the trap of the tool.

In operation, the fishing tool is lowered into the well, part 2 being suspended from the part 1, and both parts being at their limit of mutual extension. If there has been any considerable length of time between the loss of the junk in the well and the attempt to retrieve it, there will probably be a number of feet of silt deposited in the well above the junk. The tool is lowered until the progress of the lower part, that is to say part number 2, is halted by the engagement of the lower part with the body of silt. The fluid which may be mud, water, or the like, is circulated by a pump capable of delivering upwards of five hundred pounds per square inch pressure differential. When the downward travel of part 2 is arrested by contact of the shoe with whatever is at the bottom of the well, be it silt or junk, part number 1 will slide downwardly relatively to part number 2 under its own weight and that of the pipe string above it, compressing the packer sleeve 8 so that the latter bulges out as indicated in broken line in Figure 1a, forming a seal against the sides of the well casing or the well wall itself, in the event that it is not cased. The object of the seal is to enable the entire force of the pump fluid to be expended in lifting the junk and forcing it through the check valve without any part of the fluid being freely bypassed into the well between the fishing tool and the sides of the well. The water under pressure flows in through the bore 10 in the head fitting 9, through the water inlet pipe 14 and outwardly through the distributing pipes 35 and through the slots 5 to the outside of the fishing tool. This water is all directed downwardly, for the seal formed by the expanded packer sleeve 8 is in a zone above the points of discharge of the distributing pipes 35. The water under pressure will flow into the lower end of the shoe 46, in tangential jets through the slots 51 and also directly through the mouth 49 of said shoe. The water under pressure flows up through the check valve, then upwardly through the junk basket and through the annular space between the fluid inlet pipe 14 and the fluid outlet pipe 27. Then in a zone above the seal, the fluid under pressure discharges through the pipes 16, lifting the valve 19, which is held closed under light pressure. The fluid then returns to the surface of the well, and if it be mud, is collected in a reservoir as is conventional, and recirculated. The differential in pressure between the upper and lower sides of the junk, lifts it from the bottom of the well, forces it against the partially open junk check valve, causing the sectors to spread under the pressure of the junk sufficiently to let the junk pass through into the junk basket. The check valve partially closes beneath the junk, and when the pump pressure is reduced or discontinued, the unsupported weight of the junk causes it to descend upon the check valve and bias the check valve toward a flat position, which it cannot assume on account of the mutual interference of the several sectors. The junk is thus successfully retrieved, whereupon, the fishing tool is raised to the surface.

In the lifting operation the packer sleeve is released from pressed engagement with the surrounding wall of the well when the pipe string is drawn up, so as to take the weight off the part 1 of the body off of the packer sleeve, relative movements of the parts 1 and 2 being permitted within the range of play of the blocks 4 in the slots 5. When the end pressure on the packer sleeve is released it re-assumes a cylindrical repose shape, as shown in Figure 1a.

Since this fishing tool has been designed not only from the standpoint of efficiency in retrieving the junk, but also in removing the junk at the surface of the ground, and also disassembling the apparatus for the renewal of the cylinder 8 and for other purposes, a brief description of these several operations will be given.

It is noted that part 1 consists of the head fitting and the distributing unit connected by concentric pipes. If these pipes were both threaded into the head fitting and both threaded into the distributing fitting, it would be extremely difficult to remove the head, for in doing so two threaded connections would have to be loosened simultaneously. By the present construction, the slip joint has been provided in the head fitting with reference to the connection of the fluid inlet pipe to said head fitting, so that by applying the necessary tool within the pits 25 of the head fitting, rotation of the latter unscrews solely the threaded connection at the counterbore 26. After this connection has been unscrewed, the head is merely pulled away from the rest of the structure, the reduced part of the fluid inlet pipe 14 slipping out from the O-ring 13. This one simple detachment is sufficient to enable the entire part 1 to be pulled out from the lower end of part 2 after the shoe retaining ring and check valve unit have been unscrewed from the shell 37 and the slide blocks 4 detached from the sleeve 31.

If it is merely a matter of replacing the packer sleeve 8, the removal of the head fitting in the manner described permits the filler ring 7 to be slipped off from the fluid outlet pipe 27, whereupon the sleeve can be slipped off in the same way and a replacement cylinder installed.

While I have in the above description disclosed what I have found to be a practical embodiment of the invention, it will be understood by those skilled in the art that the specific details of construction and arrangement of parts, as shown, are by way of example and not to be construed as necessarily limiting the scope of the invention.

What I claim is:

1. A fishing tool for retrieving junk from the bottom of oil wells comprising a body having an upper suspending member adapted to be let down the well on a pipe string, and a lower member suspended therefrom, said members being telescopically related, with limited sliding movement in an axial direction, a packer sleeve having the elastic properties of rubber, arranged about said body in an intermediate zone, said members being in abutment with the end of said packer sleeve, whereby said packer sleeve is caused to bulge through the weight of said upper member and pipe string when said lower member lands at the well bottom, making sealing engagement with the sides of the well, said upper member including a detachable head fitting at its upper end and a cylindrical sleeve at its lower end, said head fitting having an axial bore therethrough for connection to the pipe string, a fluid distributing head positioned in the upper end of said cylindrical sleeve, a fluid inlet pipe connecting the axial bore of said head fitting to said fluid distributing head, a plurality of angularly disposed distributing pipes debouching from said distributing head opening to the outside of said body below the zone of said packer sleeve, said head fitting being formed with a fluid outlet chamber about the adjacent end of said fluid inlet pipe and having a plurality of angularly disposed bores extending from said fluid outlet chamber and opening to the outside of said body above the zone of said packer sleeve, a fluid outlet pipe coaxial with said fluid inlet pipe surrounding the latter forming therewith an annular conduit connecting the upper end of said cylindrical sleeve with said fluid outlet chamber, said lower member being a cylindrical shell slidably mounted upon said cylindrical sleeve, extending therebeyond and forming therewith a junk basket, said shell being open at its lower end, and a junk chamber check valve carried by said shell, inwardly of its open end.

2. Fishing tool as claimed in claim 1, said head fitting having an external upwardly facing annular shoulder, said angularly disposed bores opening in the upper face of said shoulder, the latter being formed as a valve seat, a valve ring about said head sealing upon said shoulder, and spring means on said head fitting biasing said valve ring to closed position with respect to said bores, under light pressure.

3. Fishing tool as claimed in claim 1, said head fitting being screwed to one of said coaxial pipes and having a freely rotatable slip joint connection with the other.

4. Fishing tool as claimed in claim 1, said head fitting being screwed to said fluit outlet pipe and having a slip joint connection to said fluid inlet pipe.

5. Fishing tool as claimed in claim 1, said shell being formed with circumferentially disposed longitudinal parallel guide slots, correspondingly disposed slide blocks mounted on said cylindrical sleeve, playing in said slots from a suspending connection between said members, the length of said slots determining the range of sliding movement between said members, said cylindrical sleeve lapping said shell to an extent sufficient to keep said slots closed throughout the range of relative sliding movement of said members, to prevent fluid discharged outside said body from said distributing pipes from bypassing into said junk basket through said slots.

6. Fishing tool as claimed in claim 1, the connection between said cylindrical sleeve and fluid outlet pipe being a reducer having its large end joined to said sleeve and its small end threaded into which end said fluid outlet pipe is screwed, the upper end of said reducer forming an external shoulder, the upper end of said shell being level with said shoulder when said lower member is suspended, and an inwardly extending annular collar freely surrounding said fluid outlet pipe, fixed to the upper end of said shell and overlying said shoulder forming therewith supplemental interconnecting means for said member.

7. Fishing tool as claimed in claim 1, said upper and lower members being interconnected by means of circumferentially disposed longitudinal parallel guide slots in said shell, and correspondingly disposed slide blocks on said cylindrical sleeve playing in said slots, said distributing pipes being correspondingly disposed, with their mouths in registry with said slots so that they discharge to the outside of said body through said slots, and said cylindrical sleeve lapping said shell to a sufficient extent to keep said slots closed to said junk basket throughout the range of sliding movement of said members to prevent the discharged fluid from bypassing back into the junk basket through said slots.

8. Fishing tool for retrieving junk from the bottom of oil wells comprising a body having an upper suspending member and a lower suspended member slidably interconnected, a packer sleeve of elastic material arranged about said body in an intermediate zone, said members being in abutment with the ends of said packer sleeve whereby said sleeve is caused to bulge into sealing contact with the sides of the well through the weight of said upper member when said lower member lands at the bottom of the well, said lower member including a shell open at its lower end forming a junk basket, an inwardly opening junk basket check valve within said shell adjacent its mouth, said shell being formed with circumferentially disposed longitudinal open slots in a zone above said check valve, said upper member including a cylindrical sleeve reciprocable within said shell functioning as a closure for said slots, blocks carried by said cylindrical sleeve slidable in said slots affording connecting means for said members, concentric liquid inlet and outlet tubes within said body, said inlet tube being connectable to a source of liquid and having distributing tubes at its lower end opening through said cylindrical sleeve in registry with said slots, below the zone of said packer sleeve, said outlet tube communicating with said junk basket at the inner end of the latter and opening through the outer wall of said body into the well above the zone of said packer sleeve.

9. Fishing tool as claimed in claim 8, the lower end of said shell terminating in a flared rim, said rim being formed with a series of circumferentially disposed tangential fluid inlet slots therethrough.

10. A well fishing toll of the type adapted for attachment to a hollow drill stem comprising a body, means on said body for detachably connecting said body to said hollow drill stem, said body having ports communicating with the lower side wall portion of said body at one end and with the drill stem at their opposite ends, a cylindrical shell slidably mounted for reciprocation on the lowermost portion of said body, said shell being provided with ports therethrough aligned with the lower ends of the ports of said body, means to prevent relative rotation between the body and the shell, a packer sleeve mounted on said body above said cylindrical shell positioned to be engaged at one end by said cylindrical shell, a shoulder on said body engageable with the opposite end of said packer sleeve, the latter being adapted to be radially expanded outwardly by compression between said cylindrical shell and shoulder, said packer sleeve being positioned above the outlet of said ports through the side wall of said body, said cylindrical shell providing a chamber opening to the interior of the end of said body opposite said drill stem, a resilient valve closing the lower end of said chamber, the lower end of said cylindrical shell being provided with ports communicating with the interior of said cylindrical shell below said valve, and said body having ports therethrough above the packer sleeve opening to the interior of said body.

11. A device as claimed in claim 10, wherein said valve is formed as a cone convergent in an upward direction and provided with resilient fingers closing the convergent end of said cone.

References Cited in the file of this patent

UNITED STATES PATENTS

| | | |
|---|---|---|
| 2,220,989 | Brauer | Nov. 12, 1940 |
| 2,675,879 | Middleton et al. | Apr. 20, 1954 |
| 2,701,019 | Steed | Feb. 1, 1955 |